United States Patent [19]

Yanagisawa

[11] Patent Number: 4,606,488

[45] Date of Patent: Aug. 19, 1986

[54] WELDING APPARATUS FOR A MOTORCAR BODY

[75] Inventor: Takashi Yanagisawa, Hidaka, Japan

[73] Assignee: Honda Giken Kogyo Kabushiki Kaisha, Tokyo, Japan

[21] Appl. No.: 456,349

[22] Filed: Jan. 7, 1983

[30] Foreign Application Priority Data

Jan. 9, 1982 [JP] Japan .................................. 57-1362

[51] Int. Cl.$^4$ ............................................ B23K 37/02
[52] U.S. Cl. ........................................ 228/45; 219/79; 219/125.11; 228/47
[58] Field of Search ....................... 228/4.1, 7, 45, 47; 219/79, 80, 125.11

[56] References Cited

U.S. PATENT DOCUMENTS

| | | | |
|---|---|---|---|
| 3,288,978 | 11/1966 | Trygar . | |
| 3,665,148 | 5/1972 | Yasenchak et al. | 228/45 |
| 3,968,558 | 7/1976 | Sekine et al. | 29/429 |
| 4,086,522 | 4/1978 | Engelberger et al. | 219/80 |
| 4,162,387 | 7/1979 | DeCandia | 219/79 |

FOREIGN PATENT DOCUMENTS

| | | | |
|---|---|---|---|
| 1405651 | 7/1972 | United Kingdom . | |
| 598751 | 3/1978 | U.S.S.R. | 228/45 |

*Primary Examiner*—Kenneth J. Ramsey
*Attorney, Agent, or Firm*—Armstrong, Nikaido, Marmelstein & Kubovcik

[57] ABSTRACT

Additional welding apparatus for welding the component parts of a temporarily spot-welded assembled motorcar body. The additional welding apparatus includes a first welding station and a second welding station. At the first welding station are front and rear pairs of under-portion welding robots positioned on floor surface surrounding the motorcar body, a machine frame extending laterally over the motorcar body, and opening portion welding robots suspended from the machine frame for welding the peripheral edges of opening portions in the respective component parts of the motorcar body. At the second welding station are a pair of further under portion welding robots positioned on the floor surrounding the welding station and a pair of upper portion welding robots suspended from a second machine frame extending laterally over the second welding station. Each of the opening portion welding robots has a gun-holding arm turnable about 360 degrees attached to the front end portion of a supporting arm which is moveable to advance and retreat to and from the opening portion.

1 Claim, 9 Drawing Figures

WELDING APPARATUS FOR A MOTORCAR BODY

BACKGROUND OF THE INVENTION

This invention relates to an apparatus for effecting an additional welding to a temporarily assembled motorcar body, and, more particularly, is directed to such an additional welding apparatus at an additional welding station for effecting an additional welding between an under body and a side panel of a motorcar body, which provides the means for an additional welding of a peripheral edge of an opening portion such as a door attaching opening portion or the like thereof.

As for an apparatus of this kind, there has been hitherto known an additional welding station having an under portion welding robot for effecting an additional welding between an under body and a side member of a motorcar body disposed on the floor, and an upper portion welding robot for effecting an additional welding between a roof panel and the side member of the motorcar body suspended from a machine frame provided thereabove. This enables additional weldings of the upper portion and the under portion of the motorcar body to be effected at that single station. (See Japanese Published Unexamined Patent Application No. 108050/Showa 53 (1978)).

In this case, the portion to be welded between the roof panel and the side member is linear in form. Therefore, the upper portion welding robot, as disclosed therein, can be small in size, light in weight, and limited to only linear movement. Thus, it is possible to provide the robot suspended from a machine frame and to make a linear welding movement thereof.

However, for an additional welding of a peripheral edge of such a non-circular shaped opening portion as a door attaching opening portion or other opening portion of a motorcar body, it is necessary to use a welding gun which is moveable round in any direction of 360 degrees to face any part of the periphery edge of the opening portion. In this request, it has been general hitherto for achieving this additional welding of the same to use a large-sized general purpose robot of which a supporting arm is given a multi-directional movement function. In this case, it cannot be avoided to use the general purpose robot in such a condition that the same is placed on a floor. Consequently, it is almost impossible from a viewpoint of a floor room space to provide the same together with the under portion welding robot at a single welding station. Additionally, from such a viewpoint that the upper portion welding robot for an additional welding between the roof panel and the side member is carried out in such a manner that a welding gun thereof is inserted into the door attaching opening portion, it is also almost impossible in terms or operation to provide the same together with the general use robot at a single welding station.

Consequently, it requires additional floor space for providing a welding station used exclusively for effecting the additional welding of the peripheral edge of the opening portion. This lengthens the additional welding line. The use of the general purpose robot makes the apparatus high in price.

OBJECTS AND SUMMARY OF THE INVENTION

The present invention has for an object to shorten the length of an additional welding line for producing a motorcar body.

The invention has as a second object, the elimination of a general purpose robot in such an additional welding line and thus a reduction in cost of the welding line.

A third object of the present invention is to eliminate the need for a separate additional welding station to be used exclusively for the additional welding of a peripheral edge of the opening portion of the side members of the motorcar body.

A fourth object of the present invention is to eliminate the possibility of mutual interferences in operation of welding robots joining the underbody and the side members of the motorcar and the weldings of the peripheral edges of the door attachment opening and front window opening portions of the motorcar body.

These objects and others which will be readily apparent to a person of ordinary skill in the art are obtained in an additional welding apparatus for a motorcar body comprising an additional welding station having a longitudinal axis. At the additional welding station is an under portion welding robot for welding an underbody and a side member of a temporarily assembled motorcar body. The under portion welding robot is positioned on a floor surface laterally of the axis of the station. A machine frame extends laterally of the axis above the motorcar body. An opening portion welding robot for welding the peripheral edge of an opening in the side member is suspended from the machine frame. This opening portion welding robot comprises a supporting arm mounted on the machine frame for advancing and retreating movement laterally of the axis. The supporting arm has a front end portion extending in the direction of the opening portion in the side member. A means for advancing and retreating the supporting arm is provided. A gun-holding arm is rotatably mounted on the front end portion and has opposite ends. A means is provided for rotating the gun-holding arm around a complete circle in a plane perpendicular to the longitudinal axis with the circle having an axis perpendicular to the longitudinal axis. A welding gun is mounted on one of the opposite ends of the gun-holding arm.

Further, the additional welding apparatus for a motorcar body can comprise a first additional welding station on a particular longitudinal axis and a second additional welding station adjacent the first station along the axis. The first additional welding station includes various welding robots. These can be a pair of front under-portion welding robots on opposite left and right sides of the axis for welding a front portion of a joined portion of an underbody member and a pair of side members of the temporarily assembled motorcar. Further, a pair of rear under portion welding robots can be provided on opposite left and right sides of the axis adjacent the pair of front under portion welding robots for welding a rear portion of the joined portion of the underbody and the side members. Both pairs of front and rear under portion welding robots are positioned on a floor surface surrounding the first additional welding station. A first machine frame can extend laterally of the axis over the motorcar body. A pair of first opening portion welding robots are suspended from the first machine frame opposite left and right sides of the axis for welding peripheral edges of openings in the side members. A second opening portion welding robot is provided for welding a peripheral edge of the front window opening portion of the motorcar body. The second opening portion welding robot is suspended from the first machine frame in front of the middle portion of a lateral dimension of the motorcar body. Each of the opening portion welding robots comprises a supporting arm mounted on the first machine frame for advancing and retreating movement relative to its respective opening portion to be welded. A front end portion of the supporting arm extends in the direction of the respective opening portion. Means are provided for advancing and retreating the supporting arm. A gun-holding arm is rotatably mounted on the front end portion of the supporting arm and has opposite ends. A means is provided for rotating the gun-holding arm around a complete circle in a plane perpendicular to the direction of movement of the supporting arm with the circle having an axis parallel to that direction of movement of the supporting arm. A welding gun is mounted on one of the opposite ends of the gun-holding arm.

The second additional welding station includes a pair of middle under portion welding robots on opposite left and right sides of the axis for welding a middle portion of the joined portion of the under body member and the side members between the front portion and the rear portion. The pair of middle portion welding robots are positioned on a floor surface surrounding the second additional welding station. A second machine frame extends laterally of the axis over the motorcar body. A pair of upper portion welding robots are suspended on opposite left and right sides of the axis from the second machine frame for welding a joined portion of a roof panel and the side members of the motorcar body.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE DRAWINGS

Figure 1A:
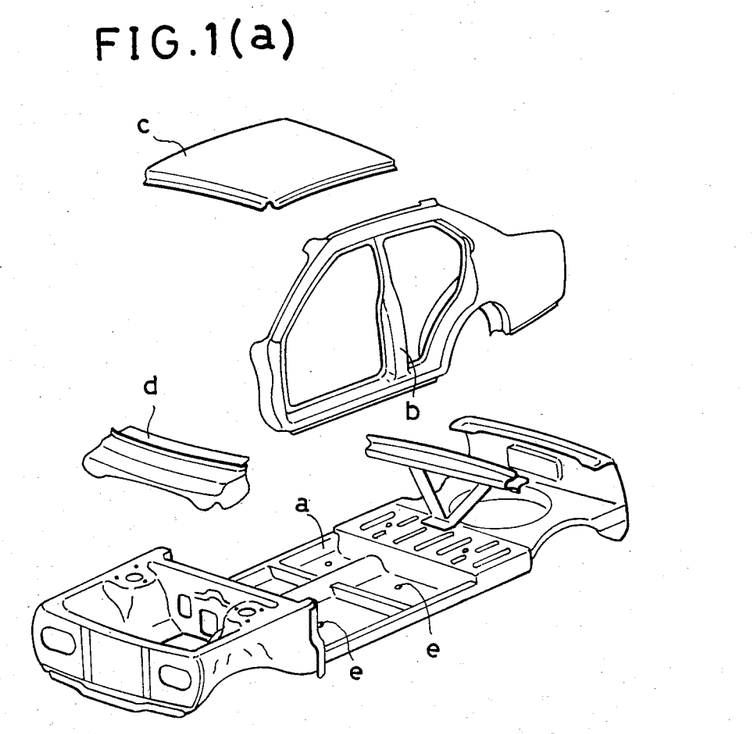
FIG. 1a is a partial perspective view of the same in an assembled condition.
Figure 1B:
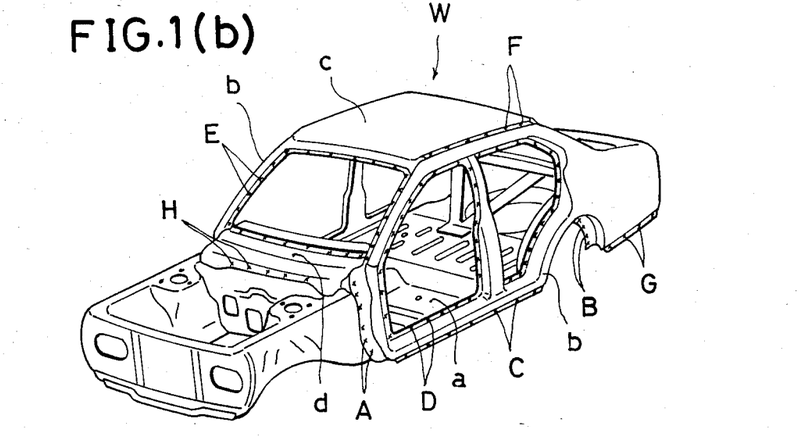
FIG. 1b is a perspective view of the same in an assembled condition.

One embodying example of this invention will now be explained with reference to the accompanying drawings:

FIG. 1 shows a motorcar body of a four-door type motorcar comprising an under-body member a, right and left side members b, b (only one of which is shown), a roof panel c and a dashboard upper section d. These are put together in position and temporarily welded together to form a temporarily assembled motorcar body W as shown in FIG. 1b. This motorcar body W is conveyed in sequential order to a first additional welding station ST1 and a second additional welding station ST2 which are disposed in series one with another along an additional welding line so that additional weldings of respective portions thereof may be carried out.

Figure 2:
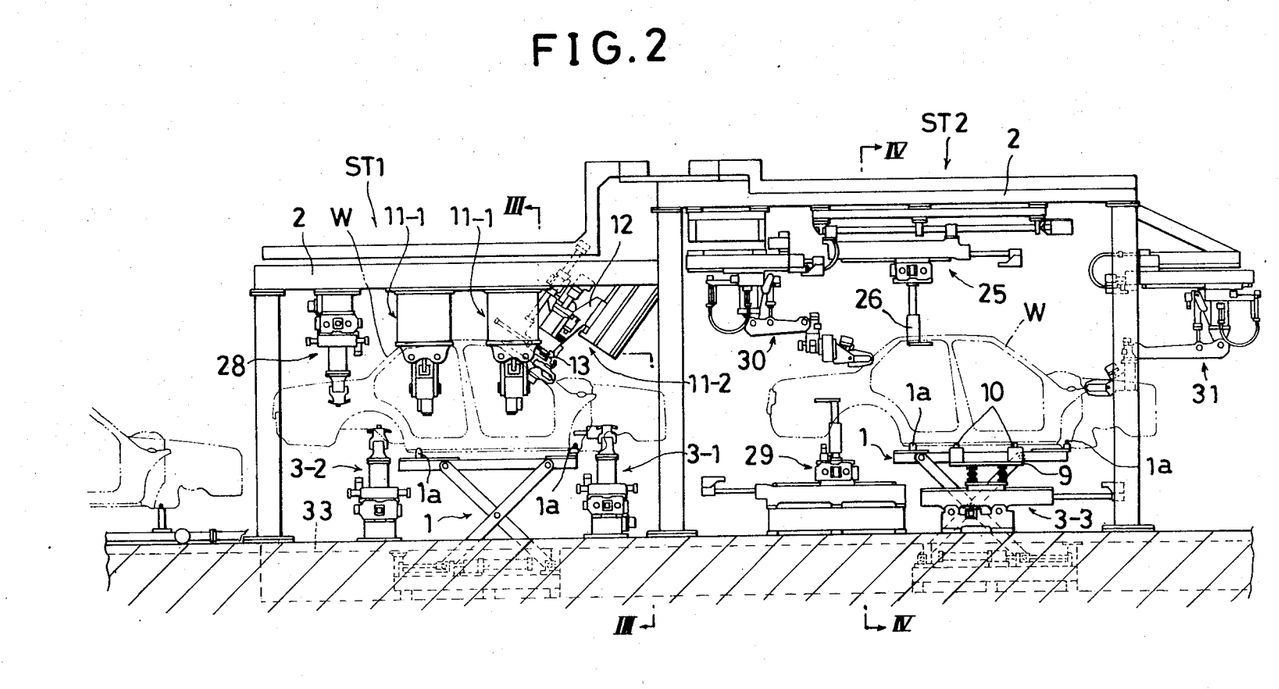
FIG. 2 is a side view of one example of the present invention.
Figure 3:
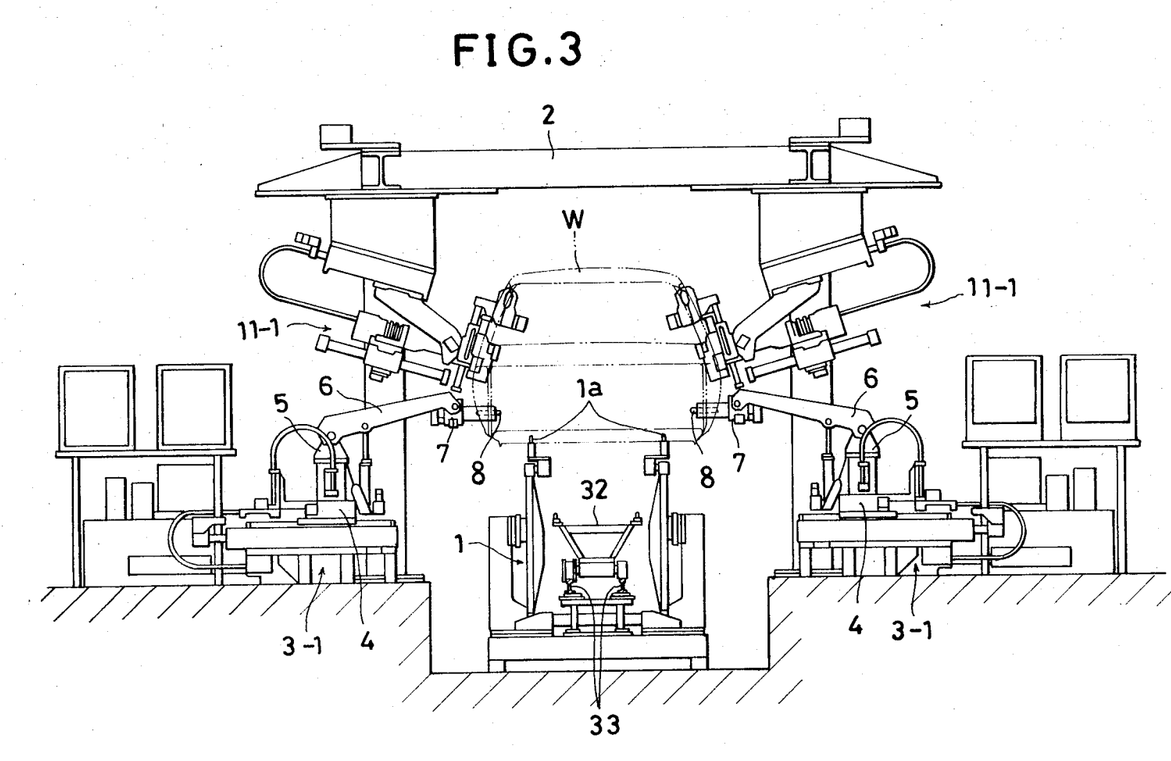
FIGS. 3 and 4 are sectional views taken along the lines III—III and IV—IV, respectively, of FIG. 2.
Figure 4:
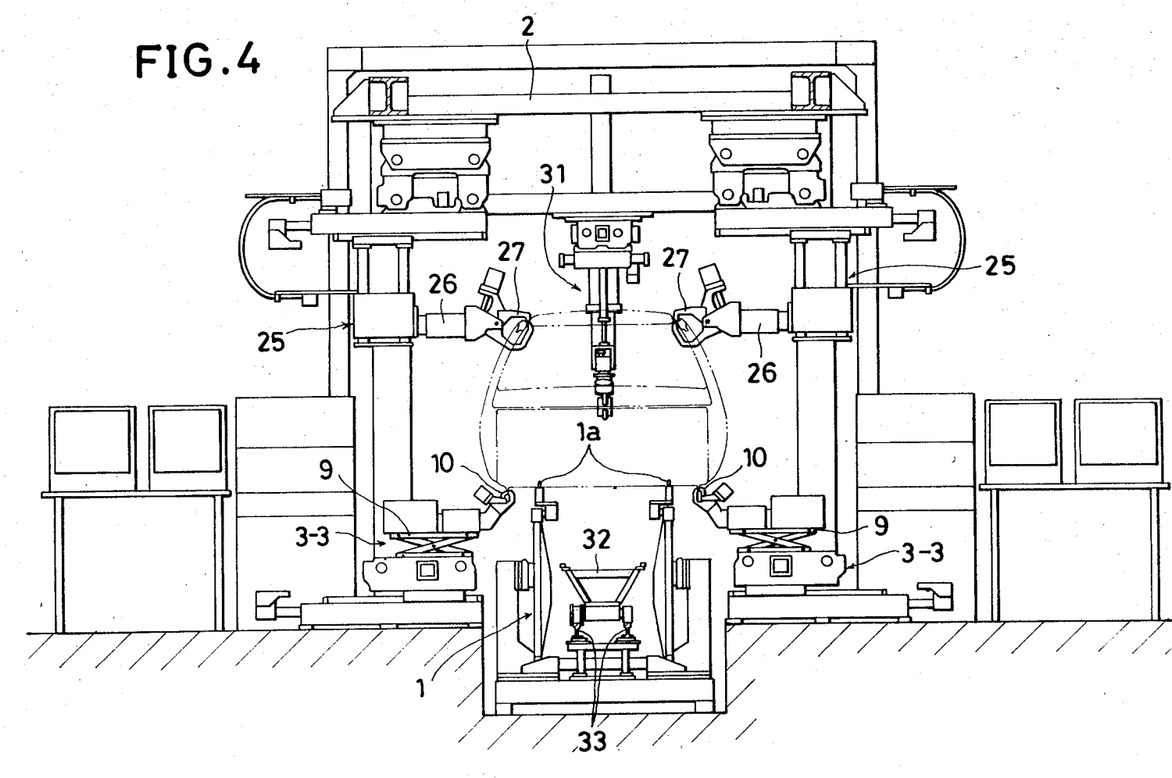

Each of the additional welding stations ST1, ST2 is provided with a lift means 1 for moving the motorcar body W upwardly and downwardly. The motorcar body W is set in position by mounting positioning pins 1a of the lift means in respective drain openings e made in the under body a. A machine frame 2 is provided thereabove. Additionally, at the first additional welding station ST1, first and second under portion welding robots 3-1, 3-2 are disposed at the front and rear for effecting additional welding of a front portion A and a rear portion B between the joined portion between the under body a and the side member b of the motorcar body W. The first and second under portion welding robots 3-1, 3-2 are provided on each of the right and left sides of the body W on a floor, adjacent the station, as shown in FIG. 2 and FIG. 3. At the second additional welding station ST2, a third under portion welding robot 3-3 for effecting additional weldings of points C on the middle portion of the joined portion between the under body a and the side member b is provided on each of the right and left sides thereof on the floor, adjacent the station, as shown in FIG. 2 and FIG. 4. These robots 3-1, 3-2, 3-3 may comprise general purpose robots, but in the illustrated example, each of the first and second under portion welding robots 3-1, 3-2 is a three-directional type robot comprising a table 4 which is moveable to advance and retreat in a direction lateral to the longitudinal axis of the station, a rotary table 5 on the table 4, and a swing arm 6 on the top of the rotary table 5 provided with a welding gun 8 attached to a front end portion of the swing arm 6 through a wrist mechanism 7. The third under portion welding robot 3-3 is a two-directional linear movement type robot moveable longitudinally and laterally of the station provided thereon with a pair of front and rear welding guns 10, 10 attached thereto through an elevating table 9.

The above construction is not especially different from that in the conventional example. According to the present invention, in order to perform an additional welding of respective peripheral edges of a door attaching opening portion and a front window opening portion of the motorcar body W at the first additional welding station ST1, first opening portion welding robots 11-1, 11-1 which are lined up front and rear for additional welding of the peripheral edges D of the front and rear door attaching opening portions are provided on each of the right and left sides of the station ST1. The first opening portion welding robots 11-1, 11-2 are suspended from the machine frame 2 provided thereabove. A second opening portion welding robot 11-2 for effecting additional welding of the peripheral edge E of the front window opening portion is provided at the first additional welding station ST1 in front of the middle portion of the lateral direction of the station and is also suspended from the machine frame 2.

Each of the first and second opening portion welding robots 11-1, 11-2 has a gun holding arm 13 turnable about 360 degrees. The gun holding arm 13 is attached to a front end portion of a supporting arm 12 which is moveable to advance and retreat to and from its facing opening portion as to be moveable to expand and contract in any of the radial directions of the supporting arm 12.

Figure 5:
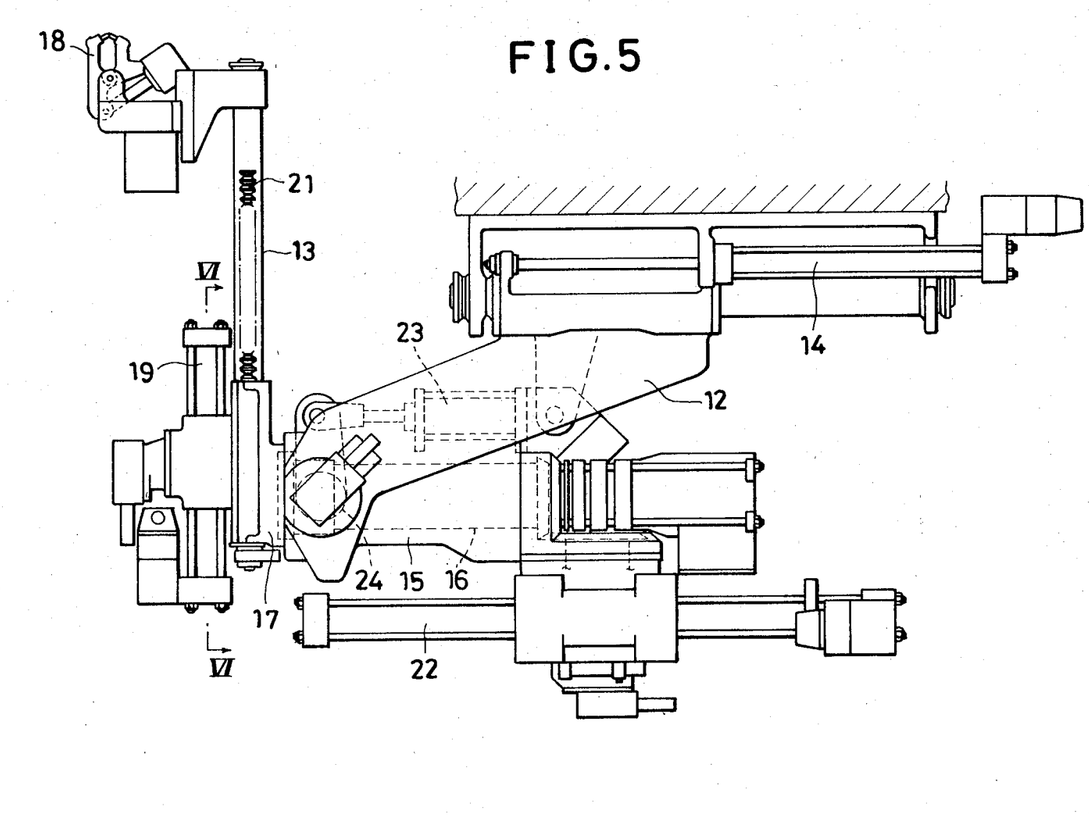
FIG. 5 is a side view of an opening portion welding robot used in the present invention.
Figures 6, 7:
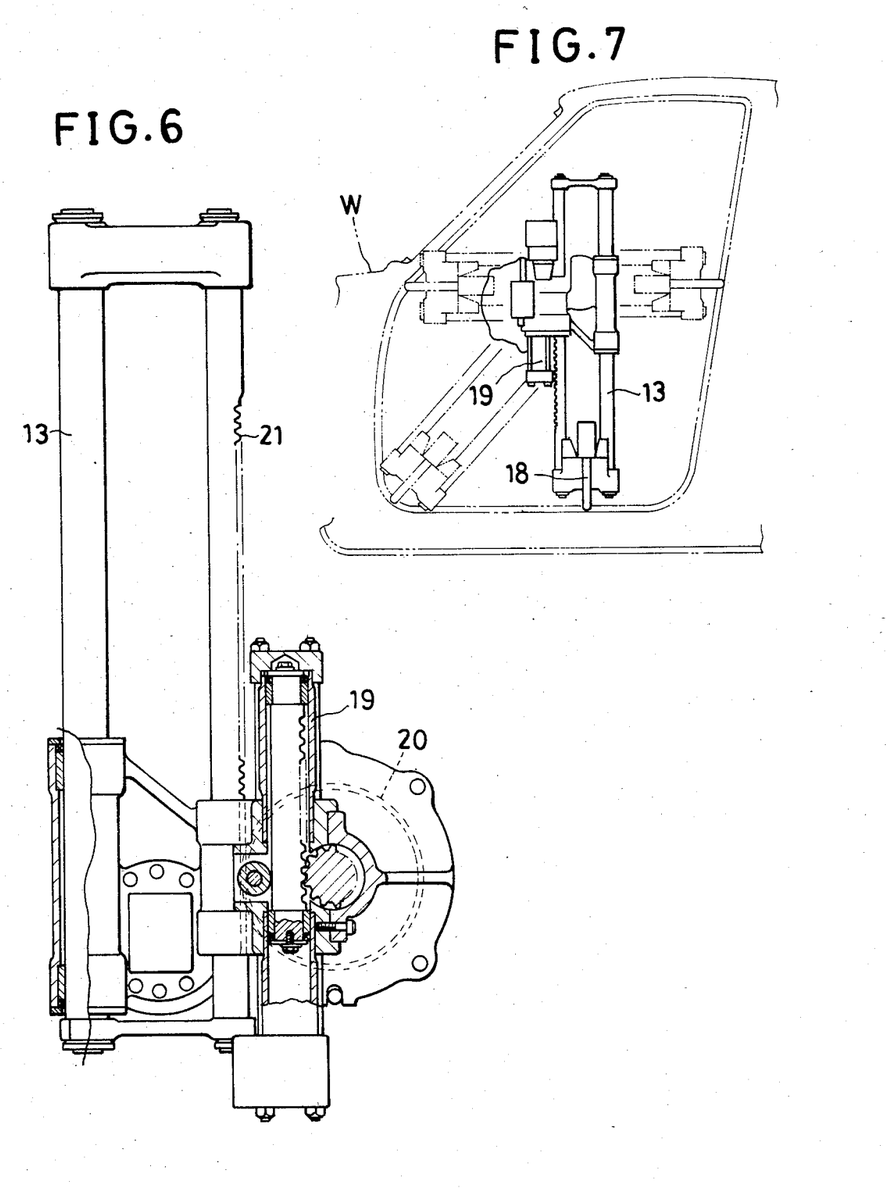
FIG. 6 is a side view, partly in section, of a gun-holding arm portion of the robot.
FIGS. 7 and 8 are diagrams for explaining an operation of the robot.

This type robot has been previously proposed in copending commonly assigned U.S. patent application Ser. No. 369,124 of Genzo Fuse, filed Apr. 16, 1982, now U.S. Pat. No. 4,542,845, and the details thereof are as shown in FIGS. 5 and 6. More in detail, the robot comprises a holding frame 15 attached to the front end portion of the supporting arm 12 which is moveable to advance and retreat along its longitudinal direction by a cylinder 14. A rotary frame 17 is attached to the holding frame 15 and is arranged to be driven to rotate by a driving shaft 16 inserted through the holding frame 15. The gun holding arm 13 is supported on the rotary frame 17 and is moveable to expand and contract in any of the radial directions thereof. A welding gun 18 is attached to a front end portion of the supporting arm 13. The arm 13 is provided with a rack 21 which is in engagement with a pinion 20 arranged to be driven by a cylinder 19 provided on the rotary frame 17 so that the arm 13 may be moved to expand and contract. Thus, the additional welding over the whole circumference of the peripheral edge of the opening portion can be effected as shown in FIG. 7 in such a way that the arm 13 is given both radial directional expansion and contraction movements and a turning round movement in any radial direction of 360 degrees by the rotary frame 17.

A cylinder 22 is provided for driving the driving shaft 16. A cylinder 23 is provided for tilting the holding frame 15 about a pivot shaft 24 in relation to the supporting arm 12.

Figure 8:
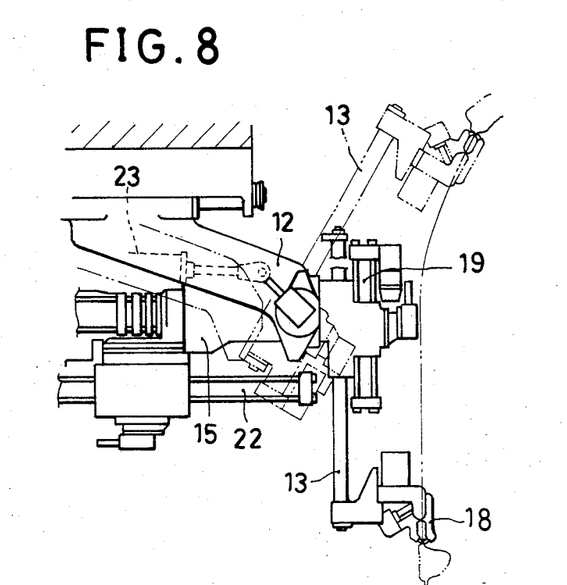

Thus, the gun holding arm may be given any desired tilted position which is inclined in relation to a plane which is at right angles to the holding frame 15, that is, the front end portion of the supporting 12, and thereby the welding gun 18 of the inclined gun holding arm 13 can be applied to any curved part of the peripheral edge of the opening portion, for instance, to a curved upper part of the peripheral edge thereof as shown by chain lines in FIG. 8 for giving an additional welding thereto. Thus, as shown in FIG. 7 and FIG. 8, the welding gun 18 can be brought to any desired position to be applied to any part of the whole peripheral edge of the opening portion.

Each of the opening portion welding robots 11-1, 11-2 constructed as described above is different from such a type of robot that a supporting arm itself thereof is given a multi-directional movement function as in an industrial general purpose robot. Characteristically, the supporting arm 12 thereof is only moveable in advance and retreat and the gun-holding arm 13 on the front portion thereof is given radial directional expansion and contraction movements. Thus, the robot is a small-sized and light-weight one, and consequently can be provided above the station in its suspended condition from the machine frame 2 as described before.

Thus, at the first welding station ST1, in addition to the additional weldings of the front portion and the rear portion of the under body a and the side member b by the first and second under portion welding robots 3-1, 3-2, the additional weldings of the peripheral edges of the door attaching opening portion and the front window opening portion by the first and second opening portion welding robots 11-1, 11-2 can be carried out in parallel therewith.

Furthermore, at the second additional welding station ST2, in addition to the foregoing third under portion welding robot 3-3 placed on the floor, an upper portion welding robot 25 is provided on each of the right and left sides thereof suspended from the machine frame 2 provided thereabove so that in parallel with carrying out of the additional weldings of a middle portion C of the joined portion between the under body a and the side member b, the additional weldings of the joined portion F between the roof panel c and the side member b of the motorcar body by the upper portion welding robot 25 can be carried out. Thus, the length of the additional welding line can be shortened by that extent.

The upper portion welding robot 25 is constructed as a longitudinally and laterally moveable linear movement type robot provided with a welding gun 27 attached thereto through an arm 26 which is moveable upwards and downwards.

If the third under portion welding robot 3-3 and the upper portion welding robot 25 were provided at the first additional welding station ST1 together with the first opening portion welding robot 11-1, operational interference between the robots could occur such as its abutment therewith or the like. However, the positioning of these robots at the second additional welding station ST2 avoids any possibility of mutual operational interferences of the robots 3-3 and 25. Therefore, the setting of operations of each of the robots 3-3, 25 can be facilitated.

Additionally, at the first additional welding station ST1, in the illustrated embodiment, a welding robot 28 comprising an arm-type robot of the foregoing three directional movement type serving to effect an additional welding of a trunk room portion of the motorcar body W is provided on each of the right and left sides thereof suspended from the machine frame 2. Further, at the second additional welding station ST2, a welding robot 29 comprising a linear movement type robot serving to effect an additional welding of points G on the rearmost portion of a line connected between the under body member a and the side member b is provided on each of the right and left sides thereof on the floor. Furthermore, a welding robot 30 comprising an arm type robot of the foregoing three-directional movement type one serving to effect an additional welding the corners of a rear window opening portion of the motorcar body W and a welding robot 31 of the same type as above for effecting an additional welding of the joined portion H between the dashboard upper section d and the under body a are disposed respectively in front and rear thereof and in the middle of the lateral direction thereof both suspended from frame 2.

Referring to the drawings, a carrier 32 is provided for conveying the motorcar body W on a railway 33.

Next, the whole operation of the foregoing apparatus of this invention will be explained as follows:

When the temporarily assembled motorcar body W is conveyed into the first additional welding station ST1, the lift means 1 is operated to elevate the motorcar body W to a predetermined position. Then the respective robots 3-1, 3-2, 11-1, 11-2 disposed at that station ST1 are moved from their waiting positions to their predetermined operating positions for effecting the additional weldings of the respective portions thereof.

When their additional weldings are completed, the respective robots 3-1, 3-2, 11-1, 11-2 are returned to their waiting positions, and the motorcar body W is lowered by the lift means 1. It is then conveyed into the second additional welding station ST2. At that station ST2, the motorcar body W is elevated again to a predetermined position by the lift means 1, and is applied with the additional weldings of the respective portions thereof by the respective robots 3-3, 25, 29, 30, 31 disposed at that station ST2. When their additional weldings are completed, the motorcar body W is lowered by the lift means 1 and is conveyed to the outside from the second additional welding station ST2. The foregoing operations are repeated.

Thus, according to a first feature of this invention, the opening portion welding robot for effecting the additional welding of the peripheral edge of the opening portion of the motorcar body has the gun holding arm turnable round 360 degrees attached to the front end portion of the supporting arm which is moveable to advance and retreat to and from the opening portion, as to be moveable to expand and contract in the radial direction of the supporting arm. In this manner, the additional welding of the peripheral edge of the non-circular shaped opening portion can be carried out at a good efficiency by the turning movement and the expansion and contraction movements of the gun-holding arm. The robot becomes much smaller in size than the conventional industrial and general purpose use robot. Additionally, according to this invention, it is so arranged that, at the additional welding station wherein the under portion welding robot for effecting the additional welding between the under body and the side member is so provided as to be placed on the floor, the foregoing robot may be suspended from the machine frame provided thereabove. In this manner, it becomes unnecessary to provide a separate additional welding station to be used exclusively for the additional welding of the peripheral edge of the opening portion. The length of the additional welding line can be shortened by that extent.

According to the second feature of this invention, it is so arranged that, at the first additional welding station for effecting the additional weldings of the front portion and the rear portion of the joined portion between the under body and the side member, the respective opening portion welding robots comprising the foregoing robots serving to effect the additional weldings of the peripheral edges of the door attaching opening portion and the front window opening portion are disposed as to be suspended from the machine frame. Additionally, at the second additional welding station for effecting the additional welding of the middle portion of the joined portion between the under body and the side member, the upper portion welding robot for effecting the additional welding between the roof panel and the side member is so disposed as to be suspended from the machine frame. Thus, a comparatively short length of additional welding line can be established, and as a result of such a separate arrangement of the robots which otherwise could result in their mutual interferences in operation if they were supposed to be disposed at the same station, any setting of the operations of the respective robots can be obtained easily and accurately.

It is readily apparent that the above-described welding apparatus for a motorcar body meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A welding apparatus for a motorcar body comprising a first welding station having a longitudinal axis and a second welding station adjacent said first welding station along said axis; said first welding station including: a pair of front under portion welding robots on opposite left and right sides of said axis for welding a front portion of a joined portion of an under body member and a pair of side members of a temporarily assembled motorcar body, a pair of rear under portion welding robots on opposite left and right sides of said axis adjacent said pair of front under portion welding robots for welding a rear portion of the joined portion of the under body and the side members, both pairs of said front and rear under portion welding robots being positioned on a floor surface surrounding said first welding station, a first machine frame extending laterally of said axis over said motorcar body, a pair of first opening portion welding robots suspended from said first machine frame on opposite left and right sides of said axis for welding peripheral edges of openings in the side members, and a second opening portion welding robot for welding a peripheral edge of a front window opening portion of the motorcar body, said second opening portion welding robot being suspended from said first machine frame in front of a middle portion of a lateral dimension of the motorcar body, each of said opening portion welding robots comprising a supporting arm mounted on said first machine frame for advancing and retreating movement relative to its respective opening portion to be welded and having a front end portion extending in the direction of the opening portion, means for advancing and retreating said supporting arm, a gun-holding arm rotatably mounted on said front end portion having opposite ends, means for rotating said gun-holding arm around a complete circle in any plane perpendicular and inclined to the direction of movement of the supporting arm, and a welding gun mounted on one of said opposite ends of said gun-holding arm; said second welding station including a pair of middle under portion welding robots on opposite left and right sides of said axis for welding a middle portion of the joined portion of the under body member and the side members between said front portion and said rear portion, said pair of middle portion welding robots being positioned on a floor surface surrounding said second welding station, a second machine frame extending laterally of said axis over said motorcar body, and a pair of upper portion welding robots suspended on opposite left and right sides of said axis from said second machine frame for welding a joined portion of a roof panel and the side members of the motorcar body.

* * * * *